United States Patent [19]
Soots et al.

[11] Patent Number: 5,364,306
[45] Date of Patent: Nov. 15, 1994

[54] NOTCHED HELICAL VANES IN THE FEEDING SECTION OF AN AXIAL AGRICULTURAL COMBINE

[75] Inventors: Daniel L. Soots, East Moline, Ill.; Klaus A. Braunhardt, Bettendorf, Iowa

[73] Assignee: Deere & Company, Moline, Ill.

[21] Appl. No.: 53,033

[22] Filed: Apr. 26, 1993

[51] Int. Cl.$^5$ .............................................. A01F 12/10
[52] U.S. Cl. ............................................ 460/68; 460/70
[58] Field of Search ............... 460/70, 68, 69, 71, 460/72, 73, 121, 122

[56] References Cited
U.S. PATENT DOCUMENTS

| | | |
|---|---|---|
| 4,148,323 | 4/1979 | McMillen et al. |
| 4,177,821 | 12/1979 | Peiler et al. |
| 4,248,248 | 2/1981 | De Busscher et al. ............... 460/68 |
| 4,266,560 | 5/1981 | Powell et al. |
| 4,362,168 | 12/1982 | Hengen et al. |
| 4,367,757 | 1/1983 | Class ................................ 56/14.6 |
| 5,145,462 | 9/1992 | Tanis et al. ..................... 460/70 X |

Primary Examiner—Terry Lee Melius

[57] ABSTRACT

The feeding section of an axial flow agricultural combine is provided with helical vanes. Each helical vane having an upstream end that is provided with a notch in which crop material is temporarily trapped. The notch is formed by tapering the upstream end of the helical vane which is welded to a transverse leading blade. The transverse leading blade is provided with a tapered leading edge to prevent crop material from hairpinning on the blade.

3 Claims, 3 Drawing Sheets

NOTCHED HELICAL VANES IN THE FEEDING SECTION OF AN AXIAL AGRICULTURAL COMBINE

BACKGROUND OF THE INVENTION

1. Field of the Invention

The present invention is directed to the helical vanes in the feeding section of an axial flow agricultural combine.

2. Description of the Prior Art

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

Axial flow combines have one or two large rotors arranged along the longitudinal axis of the machine. The rotors have feeding, threshing and separating sections axially arranged along the rotor. Harvested crop material is introduced by the feederhouse to the feeding section of the axial rotor. The feeding section of the rotor maybe provided with a propeller assembly similar to that disclosed in U.S. Pat. No. 4,148,323; or a helical blade assembly as disclosed in U.S. Pat. Nos. 4,266,560, 4,362,168 and 4,367,757.

One problem encountered by axial flow combines is that straw may slip forward off the helical vanes of the feeding section of the rotor into the gap formed between the rotor drum and the rotor bearing support.

SUMMARY

It is an object of the present invention to provide an improved helical vanes for the feeding section of an axial flow rotor which prevent straw from slipping into the gap formed by the rotor drum and the rotor bearing support.

It is a feature of the present invention that the improved helical vanes are notched at their upstream end.

It is another feature of the present invention that the helical vanes are provided with transverse leading blades.

It is another feature of the present invention that the transverse leading blades are provided with tapered leading edges that are tapered towards the direction of rotation.

A beater directs the harvested crop material from the feederhouse to the inlet of the axial crop processing unit. The inlet of the axial crop processing unit is provided with an inlet transition section comprising part of the rotor housing and the feeding section of the rotor. The feeding section is provided with outwardly extending helical vanes. Each vane is provided with an upstream end and a downstream end. The upstream end of the vane is tapered and merges with a transverse leading blade to form a notch.

Straw engaging one of the helical vanes of the feeding section, may still slip forward, but is temporarily trapped in the notch. Straw will nest in the notch until centrifugal forces throw the straw outwardly so it engages the vanes in the feeding section housing. To prevent straw from hairpinning around the transverse leading blade, the blade is provided with a tapered leading edge.

DETAILED DESCRIPTION

Figure 1:
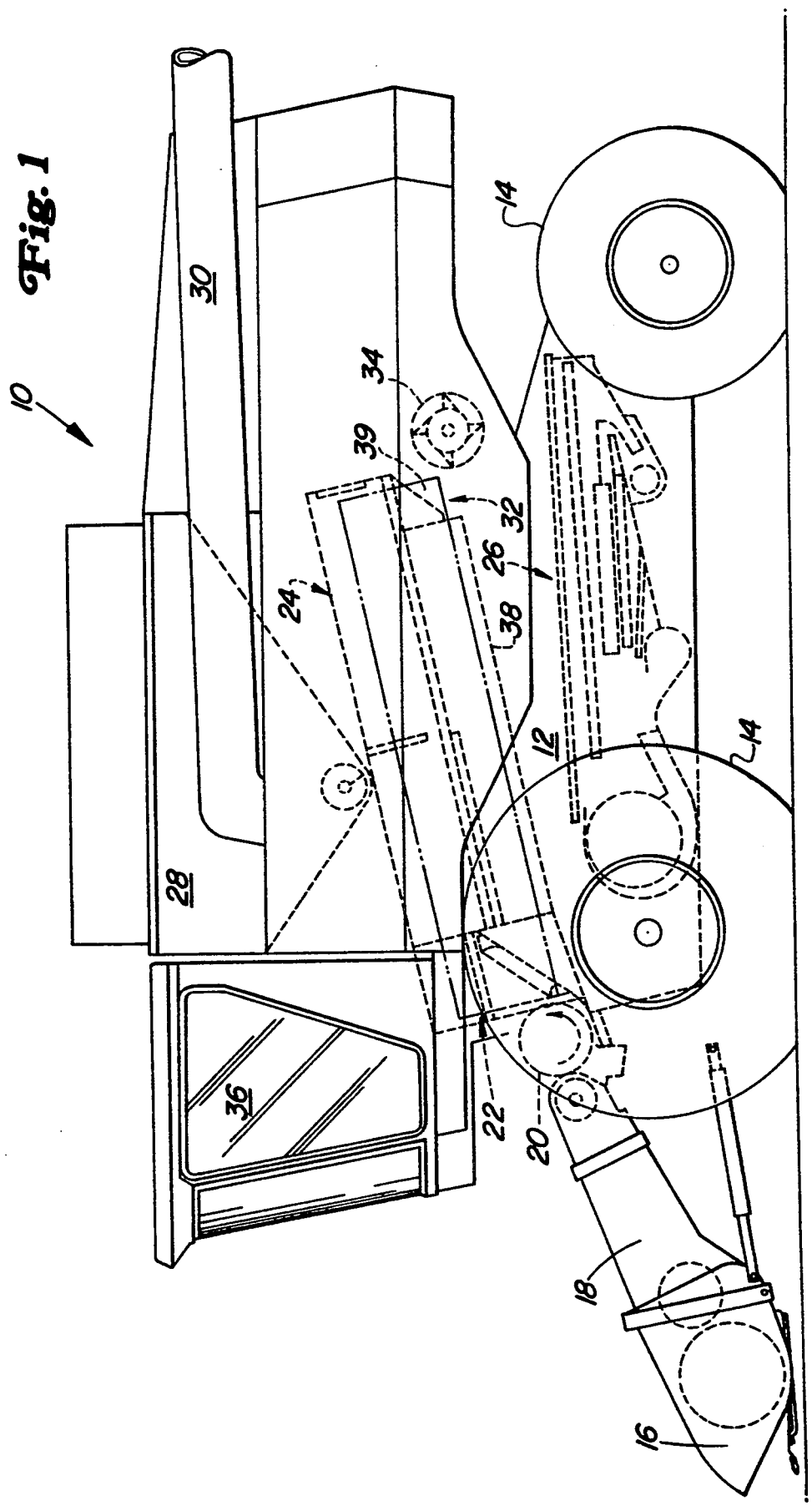
FIG. 1 is a semi-schematic side view of an axial flow agricultural combine.
Figure 2:
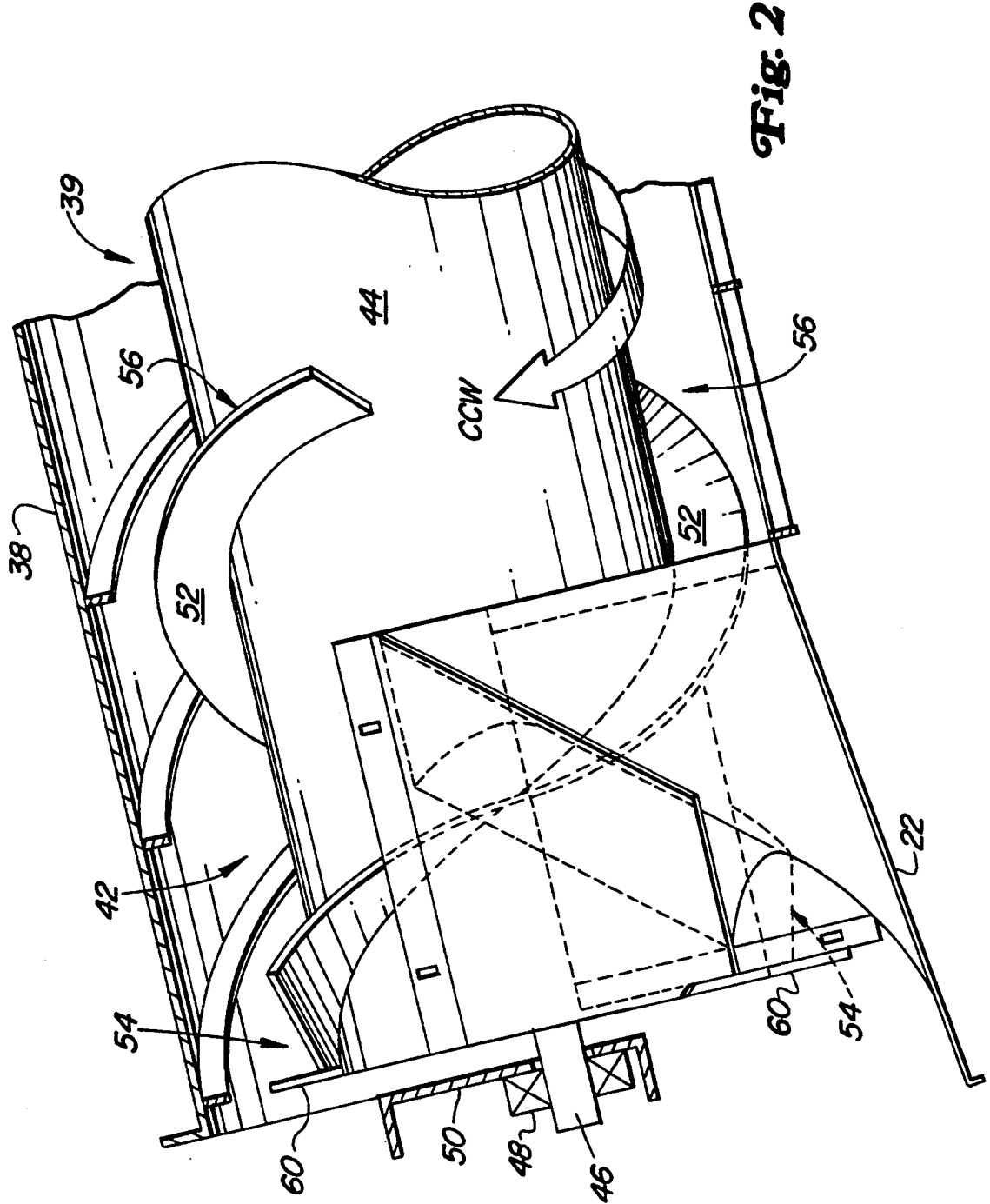
FIG. 2 is a side view of the feed section of the axial flow rotor.
Figure 3:
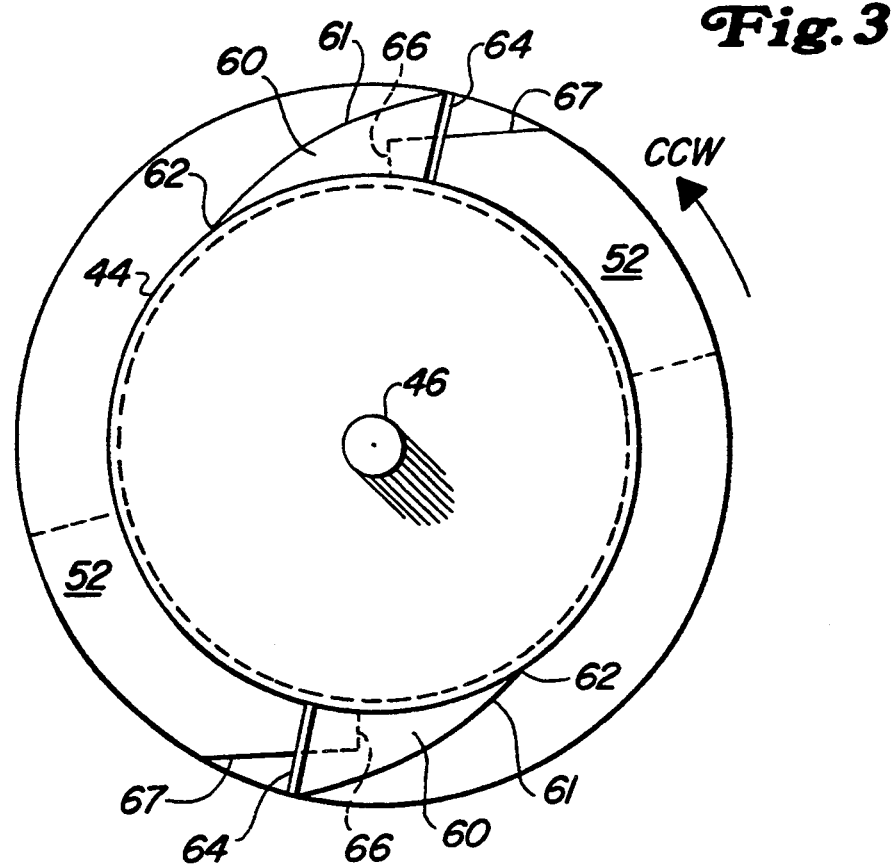
FIG. 3 is a front view of the feed section of the axial flow rotor.

FIG. 1 shows an agricultural combine 10 comprising a supporting structure 12 having ground engaging means 14 extending from the supporting structure. The ground engaging means comprises wheels that are used for transporting the supporting structure across a field. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24.

The crop processing unit 24 threshes and separates the harvested crop material. Grain and chaff fall through grates on the bottom of the unit 24 to cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger 30.

Threshed and separated straw in discharged from the axial crop processing unit through outlet 32 to discharge beater 34. The discharge beater in turn propels the straw out the rear of the combine. The operation of the combine is controlled from operator's cab 36.

The axial crop processing unit comprises a cylindrical rotor housing 38 and a rotor 39 located inside the housing 38. The rotor housing is provided with an inlet transition section 22 in which the feeding section 42 of the rotor is located. As viewed from the front the rotor rotates counterclockwise as indicated by arrow CCW. The rotor comprises a rotor drum 44 having a stub shaft 46 that is mounted in support bearing 48. The bearing 48 is mounted to cross member 50 that is mounted to the sidesheets of the combine which forms the combine's supporting structure.

The feeding section of the rotor drum 44 is a cylindrical member having outwardly extending helical vanes 52. Each vane has an upstream end 54 and a downstream end 56 reflecting the movement of harvested crop material through the axial crop processing unit 24. The upstream portions of the helical vanes are tapered and terminate in a transverse leading blade 60. The transverse leading blade 60 is provided with a tapered leading edge 61 that is tapered towards the direction of rotation to prevent hairpinning of straw and other crop material on this blade.

The tapered helical vane 52 is welded to the transverse leading blade 60 between the point 62 and the base edge 64 of the transverse leading blade at 66. The upper edge 67 of the tapered helical vane is below the tapered leading edge of the transverse leading blade at merge point 66. As such, the tapered helical vane and the transverse leading blade form a notch or dead zone in which harvested crop material is temporarily trapped as it slips forward off the helical vanes. The material is trapped there until it is centrifugally expelled outwardly by the rotor against the rotor housing.

The present invention should not be limited by the abovedescribed embodiment, but should be limited solely by the claims that follow.

We claim:

1. An axial flow agricultural combine comprising:
   a supporting structure;
   ground engaging means extending from the supporting structure for transporting the supporting structure across a field;
   an axial rotor housing having a forward open inlet for receiving harvested crop material, grates through which threshed and separated grain is removed from the housing, and a rear open outlet through which non-grain crop material is removed from the housing;
   an axial rotor for threshing and separating a harvested crop, the axial rotor being housed in the axial rotor housing, the axial rotor having a feeding section, the feeding section of the rotor is provided with at least one helical vane, each vane having an upstream end, the upstream end of the helical vane is tapered and is provided with a transverse leading blade, the transverse leading blade and the tapered helical vane forming a notch, the transverse leading blade is provided with a tapered leading edge having a point and a base edge, the tapered helical vane merges with the transverse leading blade between the point and the base edge of the transverse leading blade.

2. An axial flow agricultural combine as defined by claim 1 wherein the tapered helical vane has an upper edge that is below the leading edge of the transverse leading blade where the tapered helical blade merges with the transverse leading blade.

3. An axial flow agricultural combine comprising:
   a supporting structure;
   ground engaging means extending from the supporting structure for transporting the supporting structure across a field;
   an axial rotor housing having a forward open inlet for receiving harvested crop material, grates through which threshed and separated grain is removed from the housing, and a rear open outlet through which non-grain crop material is removed from the housing;
   an axial rotor for threshing and separating a harvested crop, the axial rotor being housed in the rotor housing, the axial rotor having a feeding section, the feeding section is provided with at least one helical vane, each helical vane having an upstream end and a downstream end, the upstream end of the helical vane having a transverse leading blade, the transverse leading blade is provided with a tapered leading edge having a point and a base edge, the helical vane merges with the transverse leading blade between the point and the base edge of the transverse leading blade.

* * * * *